United States Patent [19]

Revis et al.

[11] Patent Number: 4,927,557

[45] Date of Patent: May 22, 1990

[54] PROCESS FOR FORMING FLAKES

[75] Inventors: Jack W. Revis; John A. Sagel, both of Cincinnati; Daniel I. Ostendorf, West Chester, all of Ohio

[73] Assignee: The Proctor & Gamble Company, Cincinnati, Ohio

[21] Appl. No.: 273,692

[22] Filed: Nov. 21, 1988

Related U.S. Application Data

[63] Continuation of Ser. No. 182,265, Apr. 15, 1988, abandoned, which is a continuation-in-part of Ser. No. 46,596, May 5, 1987, abandoned.

[51] Int. Cl.[5] ........................ C11D 17/06; B29B 9/04; B02C 11/02

[52] U.S. Cl. ............................... 252/174.15; 252/174; 252/174.21; 264/144; 264/204; 264/213; 264/348

[58] Field of Search .............. 252/174, 174.15, 174.21, 252/89.1; 264/118, 144, 237, 204, 213, 348

[56] References Cited

U.S. PATENT DOCUMENTS

| | | | |
|---|---|---|---|
| 4,134,725 | 1/1979 | Buchel et al. | 252/174 |
| 4,175,976 | 11/1979 | Avera | 264/144 |
| 4,405,545 | 9/1983 | Septier et al. | 264/144 |
| 4,534,879 | 8/1985 | Iding et al. | 252/174 |
| 4,652,392 | 3/1987 | Baginski et al. | 252/109 |

*Primary Examiner*—A. Lionel Clingman
*Assistant Examiner*—Helene Klemanski
*Attorney, Agent, or Firm*—Kathleen M. Harleston; Robert B. Aylor; Donald E. Hasse

[57] ABSTRACT

Flakes of a hydrophilic solid organic material, e.g., polyethylene glycol are formed from a melt of said solid organic material on a belt cooler. The process is improved by wetting the belt cooler with water and/or an organic, low molecular weight, hydrophilic liquid to maintain contact between flake and belt during rapid cooling.

19 Claims, No Drawings

PROCESS FOR FORMING FLAKES

REFERENCE TO RELATED APPLICATION

This is a continuation of application Ser. No. 182,265, filed on Apr. 15, 1988, now abandoned, which is a continuation-in-art of U.S. Pat. No. 046,596, filed May 5, 1987, now abandoned

TECHNICAL FIELD AND BACKGROUND ART

The present invention relates to forming flakes of hydrophilic solid organic material, preferably with other material encapsulated therein, by cooling a melt of said solid organic material on a belt cooler. Typical of the desired flaked materials are those described in U.S. Pat. No. 4,652,392, Baginski et al, incorporated herein by reference.

SUMMARY OF THE INVENTION

The invention comprises a process for forming solid flakes comprising cooling a thin typically from about 0.005" to about 0.4", preferably from about 0.01" to about 0.1", most preferably from about 0.025" to about 0.05", film of a molten water-soluble or water-dispersible, non-hygroscopic plastic organic material which is preferably impermeable to detergents and/or alkalinity and most preferably nonsurface active, on a belt cooler, the surface of said belt cooler being wetted, or at least moistened, with an effective amount of a hydrophilic solvent, preferably selected from the group consisting of water and low molecular weight hydrophilic solvents such as $C_{1-4}$ alcohols containing from one to about 3 hydroxy groups, so as to improve the rate of cooling and solidification of said organic material. The surface of the belt cooler is wetted by dripping, spraying, or wiping a thin film, typically just enough to moisten the belt surface, of the hydrophilic solvent on the belt immediately prior to the addition of the plastic organic material.

The molten material, and the resulting flake can, and preferably do, also comprise other materials that are desirable and that need protection from their environment. Detergent additives such as the suds controlling components of U.S. Pat. No. 4,652,392; enzymes; cationic softeners; dyes; brighteners; bleaching agents; and reducing agents are desirable other materials, especially said suds controlling components. They are incorporated at a level of from a trace to about 40%, preferably from about 0.001% to about 20%, most preferably from about 0.01% to about 15%.

DETAILED DESCRIPTION OF THE INVENTION

The molten materials which are formed into solid flakes are either water-soluble or water dispersible and are non-hygroscopic in their solid form. Such materials are desirable for use in detergent compositions that are designed to be added to wash liquors and typically are used to protect other sensitive ingredients although they can also have utility by themselves. When they are used to protect silicone suds controlling components such as in U.S. Pat. No. 4,652,392, it is highly desirable that they be relatively non-surface active and impermeable to detergents and alkalinity.

By substantially nonsurface active is meant that the carrier material, itself, does not interact with the silicone material in such fashion that the silicone material is emulsified or otherwise excessively dispersed prior to its release in the wash water. I.e., the particle size of the silicone droplet should be maintained above about 1, more preferably above about 5 microns, and less than about 100 microns, preferably less than about 50 microns.

Of course, when preparing a dry powder or granulated detergent composition, it is preferable that the silicone suds controlling component thereof also be substantially dry and nontacky at ambient temperatures. Accordingly, it is preferred herein to use plastic, organic materials which can be conveniently melted, admixed with the silicone suds controlling agent, and thereafter cooled to form solid flakes. There are a wide variety of such plastic materials (carriers) useful herein. Since the silicone suds controlling agent is to be releasably incorporated in the carrier, such that the silicone is released into the aqueous bath upon admixture of the composition therewith, it is preferred that the carrier material be water soluble. However, water-dispersible materials are also useful, inasmuch as they will also release the silicone upon addition to an aqueous bath.

A wide variety of carrier materials having the requisite solubility/dispersibility characteristics and the essential features of being substantially non-surface active, substantially non-hygroscopic and substantially detergent-impermeable are known. However, polyethylene glycol (PEG) which has substantially no surface active characteristics is highly preferred herein. PEG, having molecular weights of from about 1,500 to about 100,000, preferably from about 3,000 to about 20,000, more preferably from about 5,000 to about 10,000 can be used. The PEG should be solid under all reasonable conditions, e.g., up to at least about 90° F. (32° C.), preferably at least 100° F. (38° C.), more preferably at least 110° F. (43° C.).

Surprisingly, highly ethoxylated fatty alcohols such as tallow alcohol condensed with at least about 25 molar proportions of ethylene oxide are also useful herein. Other alcohol condensates containing extremely high ethoxylate proportions (about 25 and above) are also useful herein. Such high ethoxylates apparently lack sufficient surface active characteristics to interact or otherwise interfere with the desired suds control properties of the silicone agents herein. A variety of other materials useful as the carrier agents herein can also be used, e.g., gelatin; agar; gum arabic; and various algae-derived gels.

A very preferred carrier material is a mixture of from about 0.2% to about 15%, preferably from about 0.25% to about 5%, more preferably from about 0.25% to about 2% of fatty acids containing from about 12 to about 30, preferably from about 14 to about 20, more preferably from about 14 to about 16, carbon atoms and the balance PEG. Such a carrier material gives a more desirable suds pattern over the duration of the washing process, providing more suds at the start and less suds at the end than PEG alone. The fatty acid delays the solubility of the suds suppressor particle and thereby delays the release of the silicone.

The preferred flaked particulate silicone suds controlling component of the present invention can be conveniently prepared by cooling molten carrier material with the suds suppressor dispersed therein on a belt cooler and then breaking said film into appropriate sized flakes.

The preferred suds controlling component of the instant composition comprises a silicone suds controlling agent which is incorporated in a water-soluble or water-dispersible, substantially nonsurface active, detergent-impermeable and, non-hygroscopic carrier material. The carrier material contains within its interior substantially all of the silicone suds controlling agent and effectively isolates it from (i.e., keeps it out of contact with) the detergent component of the compositions. The carrier material is selected such that, upon admixture with water, the carrier matrix dissolves or disperses to release the silicone material to perform its suds controlling function.

The silicone materials employed as the suds controlling agents herein can be alkylated polysiloxane materials of several types, either singly or in combination with various solid materials such as silica aerogels and xerogels and hydrophobic silicas of various types. In industrial practice, the term "silicone" has become a generic term which encompasses a variety of relatively high molecular weight polymers containing siloxane units and hydrocarbyl groups of various types. In general terms, the silicone suds controllers can be described as siloxanes having the general structural backbone.

$$-\!\!\left(\begin{array}{c} R \\ | \\ SiO \\ | \\ R' \end{array}\right)_{\!x}\!\!-$$

wherein x is from about 20 to about 2,000, and R and R' are each alkyl or aryl groups, especially methyl, ethyl, propyl, butyl or phenyl. The polydimethylsiloxanes (R and R' are methyl) having a molecular weight within the range of from about 200 to about 200,000, and higher, are all useful as suds controlling agents. Silicone materials are commercially available from the Dow Corning Corporation under the trade name Silicone 200 Fluids. Suitable polydimethylsiloxanes have a viscosity of from about 20 cs to about 60,000 cs, preferably from about 20–1500 cs, at 250° C. when used with silica and/or siloxane resin. Other silicone materials are described in U.S. Pat. No. 4,652,392.

The silcone "droplets" in the carrier matrix should be from about 1 to about 100 microns, preferably from about 5 to about 40 microns, more preferably from about 5 to about 30 microns in diameter for maximum effectiveness. Droplets below about 5 microns in diameter are not very effective and above about 30 microns in diameter are increasingly less effective. Similar sizes are required for the other silicone suds controlling agents disclosed hereinafter.

A preferred suds controlling agent herein comprises a hydrophobic silanated (most preferably trimethylsilanated) silica having a particle size in the range from about 10 millimicrons to about 20 millimicrons and a specific surface area above about 50 $m^2/g$ intimately admixed with a dimethyl silicone fluid having a molecular weight in the range of from about 500 to about 200,000, at a weight ratio of silicone to silanated silica of from about 10:1 to about 1:2. Such suds controlling agents preferably comprise silicone and the silanated silica in a weight ratio of silicone:silanated silica of from about 10:1 to about 1:1. The mixed hydrophobic silanated (especially trimethylsilanated) silica-silicone suds controlling agents provide suds control over a broad range of temperatures, presumably due to the controlled release of the silicone from the surface of the silanated silica.

Another type of suds control agent herein comprises a silicone material of the type hereinabove disclosed sorbed onto and into a solid. Such suds controlling agents comprise the silicone and solid in a silicone:solid ratio of from about 20:1 to about 1:20, preferably from about 5:1 to about 1:1. Examples of suitable solid sorbents for the silicones herein include clay, starch, kieselguhr, Fuller's Earth, and the like. The alkalinity of the solid sorbents is of no consequence to the compositions herein, inasmuch as it has been discovered that the silicones are stable when admixed therewith. As disclosed hereinabove, the sorbent-plus-silicone suds controlling agent must be coated or otherwise incorporated into a carrier material of the type hereinafter disclosed to effectively isolate the silicone from the detergent component of the instant compositions.

Yet another preferred type of silicone suds controlling agent herein comprises a silicone fluid, a silicone resin and silica. The silicone fluids useful in such suds controlling mixtures are any of the types hereinabove disclosed, but are preferably dimethyl silicones. The silicone "resins" used in such compositions can be any alkylated silicone resins, but are usually those prepared from methylsilanes. Silicone resins are commonly described as "three-dimensional" polymers arising from the hydrolysis of alkyl trichlorosilanes, whereas the silicone fluids are "two-dimensional" polymers prepared by the hydrolysis of dichlorosilanes. The silica components of such compositions are microporous materials such as the fumed silica aerogels and xerogels having the particle sizes and surface areas hereinabove disclosed.

The mixed silicone fluid/silicone resin/silica materials useful in the present compositions can be prepared in the manner disclosed in U.S. Pat. No. 3,455,839. These mixed materials are commercially available from the Dow Corning Corporation. According to U.S. Pat. No. 3,455,839, such materials can be described as mixtures consisting essentially of:

for each 100 parts by weight of a polydimethylsiloxane fluid having a viscosity in the range from 20 cs. to 1500 cs. at 25° C., (a) from about 5 to about 50, preferably from about 5 to about 20, parts by weight of a siloxane resin composed of $(CH_3)_3SiO_{1/2}$ units and $SiO_2$ units in which the ratio of the $(CH_3)_3SiO_{1/2}$ units to the $SiO_2$ units is within the range of from about 0.6/1 to about 1.2/1; and (b) from about 1 to about 10, preferably from about 1 to about 5, parts by weight of a solid silica gel, preferably an aerogel.

It is to be recognized that the amount of carrier used to isolate the silicone suds controlling agent herein from the detergent component of the compositions herein is not critical. It is only necessary that enough carrier be used to provide sufficient volume that substantially all the silicone can be incorporated therein. Likewise, it is preferred to have sufficient carrier material to provide for sufficient strength of the resultant granule to resist premature breakage. Generally, above about a 2:1, preferably from about 5:1 to about 100:1, more preferably from about 10:1 to about 40:1, weight ratio of carrier to silicone suds controlling agent is employed.

The size of the particles of the suds controlling component used in the present compositions is selected to be compatible with the remainder of the detergent composition. The suds controlling components herein do not segregate unacceptably within the detergent composition. In general, particles with a maximum dimension of from about 600 to about 2000, preferably from about 800 to about 1600 microns are compatible with spray-dried detergent granules. Therefore, the majority of the particles should have these maximum dimensions. The majority of the particles should have a ratio of the maximum to the minimum diameter of from about 1.5:1 to about 5:1, preferably from about 1.5:1 to about 4:1.

For most purposes, it is preferred to use a sufficient amount of the silicone suds controlling component in the detergent composition to provide a concentration of from about 0.0005% to about 10% by weight of the silicone suds controlling agent in the composition. A preferred amount of silicone suds controlling agent in the detergent composition lies within the range of from about 0.002% to about 0.5% by weight. Accordingly, the amount of suds control component will be adjusted, depending upon the amount of silicone suds control agent contained therein, to provide these desirable percentages of suds control agent.

All of the above patents are incorporated herein by reference.

The thickness of the flakes herein should be from about 0.005 inch to about 0.4 inch, preferably from about 0.01 inch to about 0.1 inch, most preferably from about 0.025 inch to about 0.05 inch. The flakes of the plastic organic material should be substantially solidified. This is achieved by use of the wetted belt coolers which quickly cool the sheet or flakes such that the carrier melt is hardened. With the wetted, or moistened, belt the flakes cool quicker and maintain a flat configuration better.

The surface of the belt cooler is wetted by dripping, spraying, or wiping a thin film of the hydrophilic solvent on the belt prior to, and preferably immediately prior to, the addition of the plastic organic material described above. The hydrophilic solvent is preferably selected from the group consisting of water and low molecular weight hydrophilic solvents such as $C_{1-4}$ alcohols containing from one to about three hydroxy groups, and is most preferably tap water.

By "thin film" (of hydrophilic solvent) is meant enough of the hydrophilic solvent to cause the plastic organic material to lie flat against the surface of the belt so that the plastic organic material is more evenly cooled by the belt cooler, thereby forming dry flakes. Without this invention, the plastic organic material bubbles and curls once it is applied to the belt cooler, leaving areas of unsolidified plastic organic material.

Previous to this invention, it was found that heating the water which is sprayed underneath the belt as part of the belt cooler to a temperature above the temperature at which the plastic organic material solidifies (approximately 140° F. for polyethylene glycol, for example) would reduce but not eliminate the curling. Heating the water also added cost to the manufacturing process. The water was heated in the first half of the cooling process. in the second half, room temperature water was sprayed on the bottom of the belt to cool the plastic organic material.

More than a "thin film" of water is not desirable because excess water may be absorbed by the hydrophilic plastic organic material, interfering with the flaking process. It is preferred that the thin film of hydrophilic solvent be applied by wiping the belt with a damp cloth. Most preferably, absorbent cloth should be used to wet the belt so that the film of water is less than about 0.002 inch thick, preferably less than about 0.001 inch thick. The absorbent cloth is most preferably wetted with tab water, wrung out, and used to wipe the belt immediately before the plastic organic material is added. The belt is preferably cleaned so that no grease or oil is present on its surface when the hydrophilic solvent and then the plastic organic material are applied.

All percentages, parts and ratios herein are by weight unless otherwise specified.

The following Examples illustrate the compositions herein.

EXAMPLE 1

The following compositions are prepared in flake form by melting the polyethylene glycol and mixing in the silicone or enzyme component and then cooling on a Sandvik belt cooler which has a stainless steel surface. The molten material is formed into a thin, 0.025 to 0.04 inch, sheet and the belt is evenly wetted with either butanol, water, ethanol or mixtures thereof at a level of less than about ⅜% of the material to be cooled, e.g., from about 0.1 to about 0.2%. The residence time on the belt is about .8 minute. The sheet is then broken into flakes that can be incorporated into detergent compositions.

The compositions are:

A. 95 parts of polyethylene glycol having a molecular weight of about 8000 (PEG 8000) and 5 parts of silicone/silica (Dow QCF2 3282).
B. 95 parts of PEG 8000; 1.5 parts of Dow QCF2 3282; and 3.5 parts of $C_{16}$ fatty acid.
C. 91 parts of PEG 8000 and 9 parts of Dow QCF2 3282.
D. 95 parts of tallow alcohol polyethoxylate (80) and 5 parts of silicone (Dow DC 2000).
E. 95 parts of PEG 8000 and 5 parts of silicone (GE A1 9000).
F. 95 parts of PEG 8000 and 5 parts of an alkaline protease (Alcalase).

EXAMPLE II

A composition containing 95 parts of molten polyethylene glycol having a molecular weight of about 8000 and 5 parts of silicone (Dow Corning QCF 2–3282 fluid) is prepared. Approximately 10 milliliters of this "PEG 8000 composition" is added to a large syringe. The contents of the syringe are discharged onto the middle of a 316 stainless steel plate which is approximately 1/16 of an inch thick and measures approximately 11 inches by 16 inches. Tap water (at room temperature; approximately 70° F.) is continuously being sprayed onto the bottom of the stainless steel plate using a #3 full jet nozzle (Spraying Systems #⅛ G3) to simulate a belt cooler. As soon as the PEG 8000 composition is discharged onto the plate, it is manually spread to a thin film (approximately 0.025–0.040 inch) by spreading with a spatula. Upon contact with the plate, the molten, opaque PEG 8000 composition bubbles and curls and forms a whitish, flakey material with unsolidified areas.

The plate is cleaned off and dried and the syringe is refilled with approximately 10 milliliters of PEG 8000 composition. The plate is wiped with a cloth which has been dipped in tap water and tightly wrung out, so as to leave a thin film of water on the surface of the plate. The PEG 8000 composition is discharged onto the middle of the plate and spread as before. Upon spreading on the wetted plate, the thin film of PEG 8000 composition lays flat against the plate and turns from opaque to white, indicating that it has solidified. There is no curling or unsolidified material (i.e., no wet spots). These two runs are repeated with the same results.

Two runs are conducted which are identical to the above except that hot tap water (approximately 140° F.) is sprayed on the bottom of the plate. When the PEG 8000 composition is applied to the plate and spread, the hot water is turned off and room temperature (approximately 70° F.) tap water is sprayed on the bottom of the plate. This is to simulate a two-stage cooling process on a continuous belt cooler, where first hot and then room temperature water is used to "cool" the belt. With the two-stage cooling, and without the thin film of water on the surface of the plate, the PEG 8000 composition still shows unsolidified areas, although it does not curl as much as when room temperature water only is sprayed on the bottom of the plate. When the thin film of water is wiped on the surface of the plate, the results are the same for the two-stage cooling (hot, then room temperature) as for the one-stage cooling (room temperature water only); the PEG 8000 composition does not curl and is solidified.

EXAMPLE III

A composition containing 98½ parts of molten polyethylene glycol having a molecular weight of about 8000 and 1½ parts of silicone (Dow Corning QCF 2-3282 fluid) is prepared. This "PEG 8000 composition" is continuously applied from a reservoir via a weir to a Sandvic continuous belt cooler (Sandvic Process Systems, Ind., Totowa, N.J.).

Just before the weir (approximately 1-2 feet), a 2 inch steel pipe of approximately the same width as the belt cooler (approximately 42 inches) is clamped. Foam rubber insulation (about 1 inch thick) is wrapped around the pipe. Cotton toweling is wrapped around the foam rubber. The toweling is wetted with water from municipal water supplies by means of a copper tubing distribution system rigged over the toweling. The distribution system allows enough water to drip onto the toweling to replace water lost by evaporation. Needle valves are used to control the drips.

The steel pipe is clamped above the belt so that the toweling touches the belt and applies a thin film of water to the surface of the belt as it moves. As the moistened belt moves under the weir, the PEG 8000 composition is applied. The PEG 8000 composition lies flat against the moistened belt, allowing it to solidify evenly as it cools. The belt continues to move over the cooling area as water is sprayed underneath the belt. By the time the PEG 8000 composition reaches the end of the cooling system, it has solidified and falls or is scraped off the belt, forming dry flakes.

Other processes of the invention are obtained when a 2×4 inch board without foam rubber insulation is used to hold the toweling, and when any method of applying a thin film of hydrophilic solvent is used.

What is claimed is:

1. A process for forming solid flakes comprising cooling a thin film of a molten, water-soluble or water dispersible, non-hygroscopic plastic organic material on a belt cooler, the surface of said belt cooler having been wetted by spraying, dripping, or wiping on a thin film of a hydrophilic solvent, so as to improve the rate of cooling and solidification of said organic material.

2. The process of claim 1 wherein said organic material is non-surface active and is impermeable to detergents and alkalinity.

3. The process of claim 2 wherein said organic material is selected from the group consisting of polyethylene glycol and ethoxylated alcohols and the film thickness of said organic material is from about 0.005 inch to about 0.4 inch.

4. The process of claim 3 wherein the film thickness of said organic material is from about 0.025 inch to about 0.05 inch.

5. The process of claim 1 wherein said flakes also comprise a silicone suds controlling agent at a level of from about 0.0005% to about 10%.

6. The process of claim 5 wherein said organic material is non-surface active and is impermeable to detergents and alkalinity.

7. The process of claim 5 wherein said organic material is selected from the group consisting of polyethylene glycol and ethoxylated alcohols and the film thickness of said organic material is from about 0.005 inch to about 0.4 inch.

8. The process of claim 7 wherein the film thickness of said organic material is from about 0.025 inch to about 0.05 inch.

9. The process of claim 5 wherein said organic material also comprises from about 0.2% to about 15% of a fatty acid containing from about 12 to about 30 carbon atoms.

10. The process of claim 1 wherein said flakes also comprise a material selected from the group consisting of enzymes, cationic softeners, dyes, optical brighteners, bleaching agents, reducing agents and mixtures thereof at a level of from about a trace to about 40%.

11. The process of claim 10 wherein said organic material is non-surface active and is impermeable to detergents and alkalinity.

12. The process of claim 10 wherein said organic material is selected from the group consisting of polyethylene glycol and ethoxylated alcohols and the film thickness is from about 0.005 inch to about 0.4 inch.

13. The process of claim 12 wherein the film thickness of the organic material is from about 0.025 inch to about 0.05 inch.

14. The process of claim 1 wherein said hydrophilic solvent is selected from the group consisting of water, alcohols containing from one to about four carbon atoms and from one to about three hydroxy groups, and mixtures thereof.

15. The process of claim 14 wherein said organic material is non-surface active and is impermeable to detergents and alkalinity.

16. The process of claim 14 wherein said organic material is selected from the group consisting of polyethylene glycol and ethoxylated alcohols and the film thickness of said organic material is from about 0.005 inch to about 0.4 inch.

17. The process of claim 14 wherein said flakes also comprise a silicone suds controlling agent at a level of from about 0.0005% to about 10%.

18. The process of claim 17 wherein said organic material is polyethylene glycol and the film thickness of said organic material is about 0.025 inch to about 0.05 inch.

19. The process of claim 18 wherein said hydrophilic solvent is water and is wiped on the belt cooler in a thin film.

* * * * *